United States Patent
Gu

(10) Patent No.: US 12,531,884 B2
(45) Date of Patent: Jan. 20, 2026

(54) SYSTEM AND METHOD FOR MACHINE LEARNING DRIVEN AUTOMATED INCIDENT PREVENTION FOR DISTRIBUTED SYSTEMS

(71) Applicant: Xiaohui Gu, Brooklyn, NY (US)

(72) Inventor: Xiaohui Gu, Brooklyn, NY (US)

(*) Notice: Subject to any disclaimer, the term of this patent is extended or adjusted under 35 U.S.C. 154(b) by 290 days.

(21) Appl. No.: 17/960,204

(22) Filed: Oct. 5, 2022

(65) Prior Publication Data

US 2024/0121254 A1    Apr. 11, 2024

(51) Int. Cl.
*H04L 9/00* (2022.01)
*G06N 5/022* (2023.01)
*H04L 9/40* (2022.01)

(52) U.S. Cl.
CPC ......... *H04L 63/1425* (2013.01); *G06N 5/022* (2013.01); *H04L 63/1441* (2013.01)

(58) Field of Classification Search
CPC .. H04L 63/1425; H04L 63/1441; G06N 5/022
USPC .......................................................... 726/23
See application file for complete search history.

(56) References Cited

U.S. PATENT DOCUMENTS

| | | | |
|---|---|---|---|
| 10,831,585 B2* | 11/2020 | Gu | G06N 20/00 |
| 11,895,135 B2* | 2/2024 | Kapoor | G06F 21/57 |
| 2019/0180290 A1* | 6/2019 | Jubete | G06F 9/451 |
| 2021/0103830 A1* | 4/2021 | Liu | G06N 5/04 |
| 2022/0164397 A1* | 5/2022 | Escalona | G06F 40/20 |
| 2022/0269817 A1* | 8/2022 | Nalluri | H04L 63/1441 |
| 2023/0099424 A1* | 3/2023 | Hawkinson | H04L 41/0893 709/224 |
| 2024/0080323 A1* | 3/2024 | Balmakhtar | H04L 63/1416 |

* cited by examiner

*Primary Examiner* — Christopher J Brown

(57) ABSTRACT

An unsupervised pattern extraction system and method for extracting incident and root cause patterns from various kinds of machine data such as system-level metric values, system call traces, and semi-structured or free form text log data and performing holistic root cause analysis for distributed systems. The system utilizing Natural Language Processing and machine learning techniques to extract incident and root cause information from received incident reports and other system data. The system consists of both real time data collection (104) and analytics functions (200). The previously reported incident data is used to discover and apply remediation techniques to utilize prior remediation efforts to automatically classify and correct incidents. The system may then annotate a remediation data file with the technique applied. The system will utilize prior known remediation techniques for identified categories to predict and prevent future issues.

14 Claims, 8 Drawing Sheets

SYSTEM AND METHOD FOR MACHINE LEARNING DRIVEN AUTOMATED INCIDENT PREVENTION FOR DISTRIBUTED SYSTEMS

BACKGROUND

As computer systems become increasingly complex, computer system anomalies become more prevalent, causing serious performance degradations, service outages, and, ultimately, big financial loss and brand damages. To handle the anomalies, system managers wish to receive early alerts, root cause analysis, and remedy suggestions to minimize the system downtime.

To date, existing solutions have mostly focused on detecting anomalous metric values. However, it is difficult for the system manager to understand enormous amounts of low-level anomalous raw data and manually extract meaningful insights or patterns from those many anomalous raw data. Moreover, existing techniques typically analyze system anomalies within individual components. However, production computing infrastructures often consist of many interdependent components. One component anomaly may cause other components to fail and eventually bring down the whole production system.

Existing IT management tools operate in a siloed way. Those tools typically provide monitoring data for a subset of system elements, for example network, servers, and applications, which often generates numerous superfluous alerts for the IT operator manually analyze. Some emerging AIOps tools provide alert notice reduction capabilities to help alleviate alert fatigue issues. However, server production incidents may still require significant manual effort to understand and correct, which causes significant business penalties. Thus, it is important to understand which groups of components have strong causal relationships among their failure incidents to assist IT operators and managers with a clear understanding of network issues during operation.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
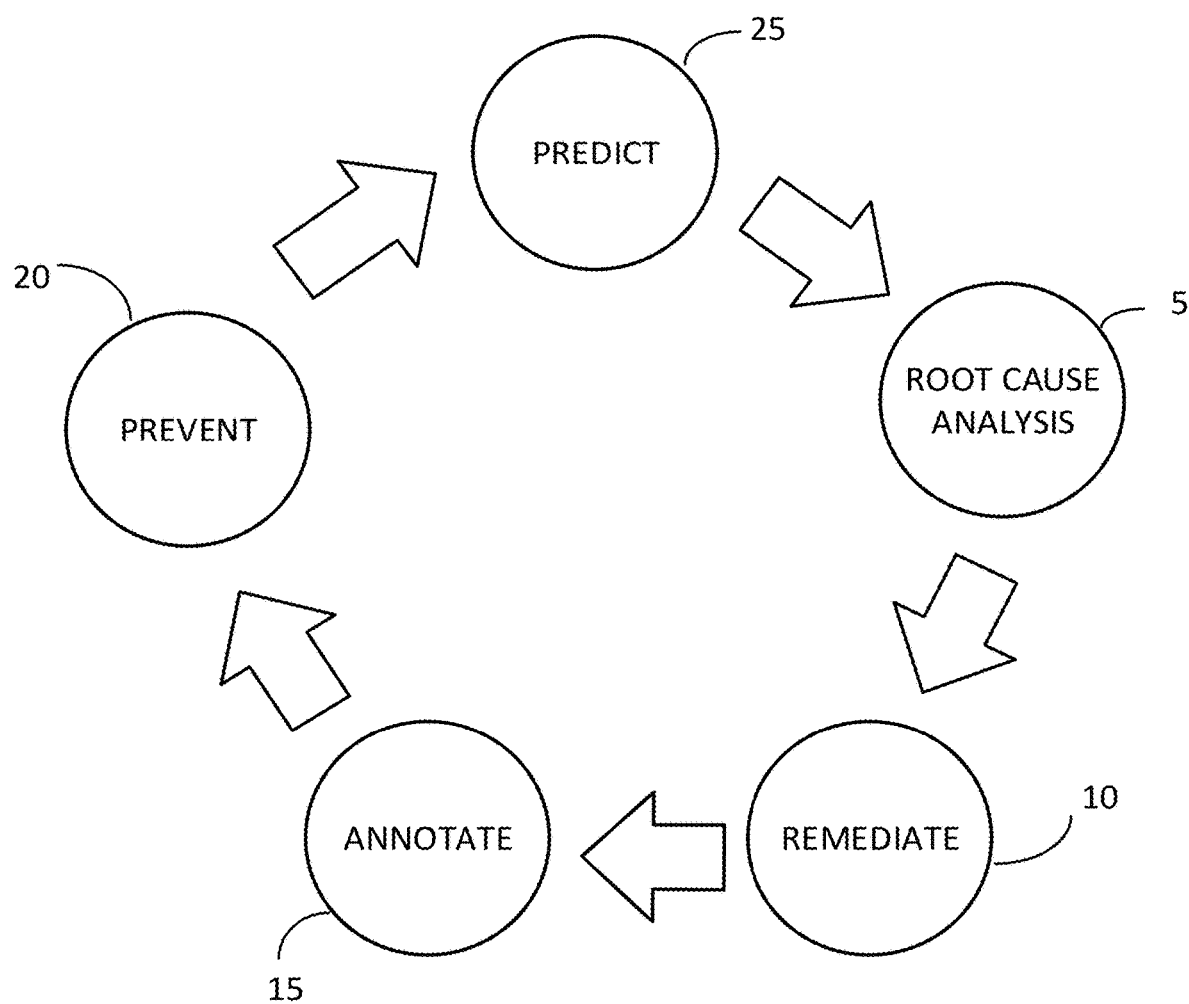
FIG. 1, is a view of the automated Incident Prevention Lifecycle consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "component" refers to computers, servers, communication devices, displays, diagnostic devices, software modules, software utilities, application programming interfaces (APIs), and all other devices and modules having a network communication connection permitting each component to be connected to one or more networked systems.

Reference throughout this document to an "adaptive learning pattern algorithm" refers to the development and use of automatic learning algorithms to extract one or more association patterns from individual component events.

Reference throughout this document to a "cascade event" refers to a condition where if a correlation probability between components is at or near 1.0, the components can be said to be highly correlated in such a way that if one component is affected by an anomaly highly correlated components are highly likely to be affected as well creating a cascade of events from one component to all components that are highly correlated with that one component.

Reference throughout this document to "Key Performance Indicator (KPI)" refers to a metric, measurement, value, valuation, or statistic in which a user has high confidence that the KPI is representative of the performance of a particular network, component, software module, or other system component.

Reference throughout this document to "remediation" refers to the discovery of a corrective action that may be used to modify, update, or repair irregularities in a system, apparatus, process, electronic memory, software release, or other network component.

Reference throughout this document to "remediation action" refers to the application of a discovered remediation to a system, apparatus, process, electronic memory, software release, or other network component.

This document presents innovative machine learning based technologies to automatically map predicted incidents and the associated root causes of such incidents into proper prevention actions.

In an embodiment, the present invention relates to unsupervised online event pattern extraction and holistic root cause analysis in distributed systems. In a non-limiting example, the invention is implemented in public and private cloud environments.

The innovation herein described may enable a fully automated incident management cycle starting from incident prediction and root cause investigation to remediation recommendation and execution. Only by automating the whole incident management cycle may the operator be relieved from the burden of constant remediation efforts. The instant innovation may focus on providing automatic inferences from predicted incidents and associated root causes into effective remediations and provide easy-to-use workflow configuration tools to enable automatic incident fix in production environments. In a non-limiting example, if an available memory decrease is observed and the system predicts a production service outage will happen when the available memory depletes, the system will first analyze the root cause of the available memory decrease. If the root cause is localized as a software bug resulting from a recent software release, the system may revert the software release in the deployment server to prevent a production service outage.

In an embodiment, the instant innovation achieves fully automatic incident prevention without requiring any user input or intervention through the use of innovative online machine learning models such as artificial neural networks, random forest, and reinforcement learning. The models are used to achieve accurate mapping from predicted incidents (e.g., service outage, service level objective violations such as response time >5 seconds) and an associated root cause for each incident (e.g., software bugs, hardware failures, resource contentions) to create and report actionable remediation actions.

In an embodiment, the instant innovation is comprised of three major components: 1) a universal pattern extraction system that can extract precise patterns from various data sources including metric data, log data, incident ticket data, system call data, and performance tracing data; 2) a self-learning remediation recommendation system which can map pairs of root causes and predicted incidents into proper remediation actions; and 3) a remediation workflow engine which allows the user to configure and trigger remediations via graphical user interfaces. These three components work together in a fully automated incident management framework, to significantly relieve the burden of incident remediation for IT service operators.

In an embodiment, the innovation may first perform metric event pattern extraction. In this embodiment, the innovation first provides automatic unsupervised multi-variant statistical classification methods to extract principle event patterns from large amounts of raw metric data streams for a system under analysis. Each event pattern captures a unique system state. A modern server system typically operates under different states over time because of environment changes such as workload fluctuations, resource allocation change, software updates, or other actions required to meet processing load, system updates, or other maintenance and operational needs. In this embodiment, the system may capture all unique system states of a live production server using unsupervised online learning algorithms.

In an exemplary embodiment, the innovation may further identify key features of each event pattern to automatically create a label for each event pattern. In a non-limiting example, if the innovation identifies the key metrics that make an event pattern unique are the result of a gradually increasing memory consumption and a near constant CPU usage, this event is identified as a "memory leak" and the event is labeled and stored under this identification. A user may override or edit the label using domain knowledge that is specific to the domain in which the system under analysis is operational.

In an embodiment, the innovation may also automatically identify recurrent event patterns by comparing newly extracted patterns with previously captured and stored patterns. As a byproduct of the event pattern extraction service, the innovation may also provide data compression benefit to the user by only storing unique patterns. This operation avoids duplication and promotes more efficient storage of patterns and optimizes search time when recalling event patterns for analysis or comparison. To further simplify the event browsing for the user, the innovation may further aggregate continuous events of the same pattern into one consolidated event.

In an embodiment, patterns can be extracted through one or more analysis methods. A pattern may be extracted through the recognition of an incident pattern. In this embodiment, an IT service incident can be defined by a high priority ticket or problem report in an incident management system. In a non-limiting example, such a high priority ticket could be identified as "VPN service on host 170.41.5.1 is not responding, priority level=1". Equally the pattern could be identified as a KPI violation, such as "shopping cart response time >5 seconds". For the first incident type, the system may employ natural language processing (NLP) to extract meaningful phrases from the high priority ticket raw content which is typically created by a human technician and uses certain features in those phrases (e.g., frequency) to extract patterns (e.g., frequency combinations of different phrases). Such high priority ticket data descriptions may be highly noisy necessitating one or more filters for the incoming data descriptions. For example, customers can include IP addresses, device names, URLs, or even core dumps in the ticket descriptions. To address the filtration of the incoming data descriptions the system may introduce NLP based filters to remove those noise-inducing phrases (such as IP addresses, device names, URLs, core dumps) before performing ticket pattern extraction. As a result, the patterns extracted may capture the principal features of those incidents. However, under certain contexts different device types in the incident ticket data description may need to be considered. In a non-limiting example, a problem on a network switch needs be fixed in a different way from a problem on a server machine. If the system simply filters out all device names from ticket descriptions, the system may be unable to extract a precise incident pattern to distinguish the incidents from different device types. Combining NLP filters with infrastructure metadata information from external repositories such as a configuration management database (CMDB) may achieve precise pattern extraction. For KPI violation incidents, the system may use the same device type identification technique to distinguish KPI violations happening on different machines. In a non-limiting example, a slow response on a database server requires a different fix from a slow response from a web server.

In a non-limiting embodiment, a pattern may be discovered utilizing Root cause pattern extraction. For root cause patterns, the system may develop a set of fine-grained pattern extraction techniques. In Root cause pattern extraction, the system may first perform analysis over anomalous metrics to extract specific anomalous patterns to characterize specific root causes. In a non-limiting example, if the anomaly detection algorithm has identified a root cause to be a CPU metric anomaly in a database server, the system will identify specific anomalous patterns such as breaking a cyclic CPU usage pattern from a periodical workload or causing trend changes (e.g., upward trend to downward or flat trend) in CPU consumption.

In an embodiment the system may utilize various time series analysis techniques to acquire those pattern features. In a non-limiting example, the system may leverage the fast Fourier transform (FFT) method to detect cyclic pattern changes. The system may also leverage regression techniques to compute the slope of the time series and detect trend changes by identifying slope changes.

In an embodiment, for log anomalies, the system may perform NLP analysis to consolidate related anomalous log entries. In a non-limiting example, if the incident is caused by a software hang bug in one component, the system may observe a surge of different timeout exceptions from different components. To perform such a consolidation, the system may first consolidate similar anomalous log entries, such as exceptions from databases and then perform dictionary-based grouping to separate exceptions from different servers, such as exceptions from databases vs exceptions from web servers. The system may further augment the root cause patterns by performing an analysis over trace data, including system call traces and stack traces, during the anomalous period before the impending incident to provide more clues for the creation of recommendation for proper remediation actions. In a non-limiting example, the system can perform anomaly detection over system call traces and stack traces to identify whether the incident is caused by a timeout bug or a software hang bug and further localize the root cause functions by combining the stack trace analysis and binary code analysis.

In an embodiment, a pattern may be extracted through the recognition of a transferrable pattern. In order to achieve machine learning driven automatic remediation, the incident and root cause patterns should be reusable across different computing environments and workloads. To make those patterns reusable, it is important to identify which features are portable, that is, workload- and environment-independent. In a non-limiting example, if an incident is caused by a software bug that gradually depletes the disk space, the absolute disk usage metric values during the anomalous period are likely not portable since they may vary on different machines under different workloads. However, the downward trend feature is portable across different incident occurrences or computing machines. Thus, the system may employ cross-platform evaluation schemes to identify those portable and non-portable features. The basic idea is to evaluate the correlation among the values of the same feature across different environment and application workloads. If the correlation is low, the system may infer that this feature is application- and environment-dependent, and thus non-portable. One or more scalable correlation techniques may be provided by the system to efficiently identify those portable features from a potentially large number of pattern features. Upon identification the non-portable features may be dropped during the pattern matching or classification process and will no longer be used in an identification analysis.

In an embodiment, the innovation may next perform operations to permit the extraction from log files of event patterns. In addition to metric data, many customers already collect large amounts of log data through the operation of existing log collections and search tools such as ELK and Splunk. Log data provides useful information especially for anomaly diagnosis. Existing log analysis tools focus on providing search and query support with little support for automatic pattern extraction. Different from metric data, log data are semi-structured or unstructured. In order to apply statistical machine learning algorithms to extract patterns from the accumulated log data, the innovation may first extract quantitative features from the raw log data. In this embodiment, the innovation implements two schemes to address the issue of extracting quantitative features from raw log data. The first approach is to extract popular keywords from all the log events and use the frequency of keywords to construct the feature vector for each log event. The innovation may also provide word filtering functions for the user to filter out uninteresting words such as articles, verbs, and adjectives. In the second approach, the innovation may further extract popular phrases, where the popularity of a phrase is based upon the number of times the phrase appears in the incoming log data, using a frequent episode mining algorithm. The innovation may then construct frequency feature vectors in a similar manner as constructing word frequency vectors. The innovation may also provide a user interface for the user to conveniently choose the interesting keywords and phrases he or she prefers to use in the analysis algorithm.

In an embodiment, after extracting feature vectors from raw log data, the innovation may apply unsupervised machine learning algorithms over extracted feature vectors to group log data with similar feature patterns together. This log pattern extraction service can help users browse through a large number of log events and extract useful information in a more efficient way. Moreover, this classification can be useful for incident triage by helping a user to identify previously diagnosed events. The innovation may also achieve log data compression by identifying common parts among similar log data and replacing common parts with a pattern identifier to eliminate duplicate log data and optimize the storage of data within the log files.

In an embodiment, in addition to log event classification, the innovation may also perform rare event identification by identifying those log data patterns that rarely appear in the analyzed log data. A histogram may be created to present to a user those event patterns that appear more or less frequently, or appear in an unusual way.

In an embodiment, the innovation is operative to perform system call trace pattern extraction for the system under analysis. The system call trace pattern extraction receives analysis data from system call traces and function call traces to create a set of system call sequence patterns for application functions called. This data may be used to extract patterns for system call traces that have been affected by some anomaly. The system call sequence pattern extraction may be used to develop a list of affected functions that may be reported to a user.

In an embodiment, the innovation is operative to create an adaptive pattern learning framework. Modern computer systems are highly complex and dynamic, especially for emerging container-based architectures where application components can be dynamically created and deleted with high frequency. The innovation may provide an adaptive pattern learning framework that can accommodate both environment changes (in the form of workload changes, resource availability variations, and other environment changes) and different kinds of applications such as long-running batch jobs in comparison with short-running tasks.

In an embodiment, the innovation provides for associative event analysis to further develop automatic learning algorithms to extract the association patterns from individual component events. The event association algorithms extract possible correlation and causality relationships among different system components based on the start time of different events. A cascade of components affected by events may be discovered through a correlation of the relationships between various components in the system. A sequence of relationships between components may be constructed and the correlations applied to determine all possible cascade sequences for components that are highly correlated in the event of a system anomaly affecting any component within the sequence of relationships.

In an embodiment, the system may perform a scalable pattern search. After extracting a large number of fine-grained, reusable patterns, the system may provide an efficient and scalable search capability for the remediation inference component to quickly find matching root cause and incident patterns. Automatic pattern categorization schemes are developed to classify different root cause and incident patterns into different categories such as, in non-limiting examples, performance, configuration error, and hardware failures. The system may then implement a hierarchical search mechanism to start from category matching then perform pattern matching. The key challenge is to extract those key features which are most strongly correlated with the anomaly which is either a root cause or an incident. The system may use machine learning techniques such as feature attribution and dimensionality reduction techniques to select a number of "representative" features to derive the pattern categories. In a non-limiting example, if an incident is caused by high CPU usage, the system could identify a set of system metrics such as CPU time, LoadAvg1, LoadAvg5, LoadAvg15, which are all strongly correlated with the incident. But if CPU time, LoadAvg1, LoadAvg5, LoadAvg15 are also strongly correlated with each other. The system may then just use one of the set of system metrics to categorize the root cause.

The system may further categorize each incident in a holistic way from different aspects to enable efficient remediation inference search and matching. In a non-limiting example, a distributed data processing system incident may be described utilizing four aspects: 1) symptoms describing what kind of problem, such as a system hang, performance slowdown, or crash, the system experiences; 2) root causes describing the specific software and/or hardware faults that have caused the incident; 3) propagation chains describing how anomalies propagate in the distributed system; and 4) bug-triggering input data that describe what kinds of input data can trigger the incident. The system may not necessarily have all the category information for each incident. The system may use a set of training incidents labelled with categories to build classification models which can quickly classify a new incident into one or more relevant categories.

In an embodiment, proper system orchestration services such as auto-scaling, migration, and/or reboot may be automatically triggered by matching a detected or predicted event with stored anomaly pattern to automatically repair an unhealthy system as an automatic fix. The system manager can configure the orchestration functions based on different extracted event patterns. In a non-limiting example, if the event is recognized as a memory leak bug, an autofix action could be recommended and configured for action. The autofix action could be specified to require rebooting the software to prevent the system outage and alert the developer to patch the memory leak. If the detected event type is network congestion, migration actions may be undertaken to avoid the impact of bandwidth shortage. By automatically identifying different event patterns, the innovation allows the system manager to configure proper autofix actions to be triggered automatically without human intervention.

In an embodiment, the system for computerized network anomaly prediction and correction may consist of a processor in networked data communication with a plurality of networked components and a plurality of software components. Including a software module operative to capture unique system status of one or more network production servers through the use of unsupervised learning algorithms where pluralities of networked components are transmitting at least event trace data, call trace data and log event data to the system processor.

Additionally including a software module operative to label one or more system conditions that correspond to the metric data values that contribute to an identified anomaly pattern as defined by a system user, where the event labels may be edited or over-written by a human user with specific domain knowledge. The system may use said event trace data, call trace data, and log event data to create one or more anomaly events associated with said anomaly pattern, where each identified anomaly pattern is given a label that is further defined by a human user. The system may aggregate two or more events having substantially the same event pattern into a consolidated event and analyze said anomaly events utilizing correlated relationships between said pluralities of networked components for extracted anomaly patterns to discover one or more events.

In an embodiment, the system may provide remediation classification models using machine learning techniques to achieve intelligent remediation recommendations for different incidents triggered by different root causes. By doing so, the system may require operators to specify and maintain a large number of remediation rules based on empirical knowledge. Two approaches are integrated to build remediation classification models. NLP is first leveraged to analyze historical ticket data to understand past remediations. In existing incident management systems such as ServiceNow, each incident ticket typically includes certain comments such as "close notes" and "last comments" about how the operator fixes the issue in the past. The system may leverage NLP to parse those comments to extract key operations such as, in non-limiting examples, "restart server X", "clean up disk space", and "replace broken network switch". The identified operations may be used as labels to train classification models utilized by the system to map a predicted incident pattern and its associated root cause patterns to the proper remediation action. The system may then build classification models using different classification algorithms such as random forest trees and neural networks. The system may explore alternative approaches to acquiring training labels for incident remediations by tracking the operations done by the operators in a SaaS product.

In addition to remediation efforts by the system, the system may support integrations with existing incident management tools such as ServiceNow to retrieve candidate remediation workflows. When a specific incident is predicted by the instant system, the operator may be given a set of candidate remediations and he or she can choose the most suitable actions from existing ones or create a new action workflow if none of existing ones can fix the root causes and avert the incident. The system may track those user choices which are then used as labelled training data to enhance any remediation classification models. By combining the above two approaches, the system may collect enough labelled training data to build a high-quality classification model. Moreover, because identified and learned patterns are reusable, the system may also aggregate training data collected across different platforms tracking different operators.

In an embodiment, in real world production environments, remediation actions even triggered by most experienced operators are not guaranteed to always correct the identified issue or problem because system environments and application behaviors can dynamically change. Thus, the system may leverage reinforcement learning techniques to continuously enhance remediation classification models by incorporating various feedback information into the model update process. The key parameters in reinforcement learning models are actions and reward functions. The actions are different triggered remediation operations and the reward functions can be defined as the change to the system health score. If the remediation action is effective, the system health score will be improved and if the remediation action is ineffective, the system health score will be unchanged or even decreased. The system may use reinforcement learning to continuously enhance remediation recommendation models and adapt to dynamic computing environments. The system may also provide annotation schemes for the user to easily provide feedback about system recommendations and leverage the feedback to continuously improve the accuracy of all recommendations provided to users. The system may also integrate static binary analysis techniques to provide detailed code-level fix recommendation for a set of hard-to-debug performance bugs such as software hang bug, timeout related bugs, and data corruption induced bugs.

The system provides a distributed federated learning system that employs a light-weight analysis engine on the edge nodes to perform anomaly detection over various machine data (e.g., log entries, metric time series data, application performance trace data) using unsupervised machine learning algorithms. Only anomalous data are forwarded by the edge analysis engine to the core analysis engine to save network bandwidth cost. The core analysis engine then combines anomalies from all edge nodes to perform holistic causal analysis and incident prediction for performing automated incident prevention for distributed systems.

The system may extract one or more patterns from said system call trace data to develop a list of affected functions and recommendations to be reported to a user. Upon such identification, the system may utilize system user defined orchestration functions to trigger autofix functions for said events, define autofix functions to correct the one or more issues or events, reporting autofix actions, and providing predictions and recommendations for additional corrective action to a system user.

Turning now to FIG. 1, this figure presents a view of the automated Incident Prevention Lifecycle consistent with certain embodiments of the present invention. The incident prevention system may perform a root cause analysis for incidents that are reported to the system 5. The root cause analysis may gather incident reports and machine data, comprising metric data, log entries, application performance tracing data, and/or system call data for incidents that occur within the bounds of a system being monitored by the incident prevention system. The incident prevention system may use Natural Language Processing and other analysis techniques to review the incidents being reported in natural human language to label and categorize the incidents that have been recorded. From these analyses, the incident reporting system may determine to what category an incident may belong and utilize this categorization along with any reported successful correction from said incident reports to determine the remediation that may be required to address and correct the issue or problem being reported 10. Upon the application of an identified remediation technique, the incident prevention system may annotate the remediation files with the success or lack of success for a remediation technique that was recommended and applied 15. The incident prevention system may utilize the received incident reports and machine data to identify and prevent future issues based upon the data contained in the metric data, log entry, application performance tracing data, machine data, and any other incident reporting data to identify and issue recommendations and/or techniques to prevent issues and incidents in one or more components within the bounds of the networked system being monitored 20. The incident prevention system may also issue predictions and recommendations to one or more users to forestall the occurrence of identified system issues and incidents when the conditions for such identified system issues incidents begin to appear in received machine and monitoring data 25.

Figure 2:
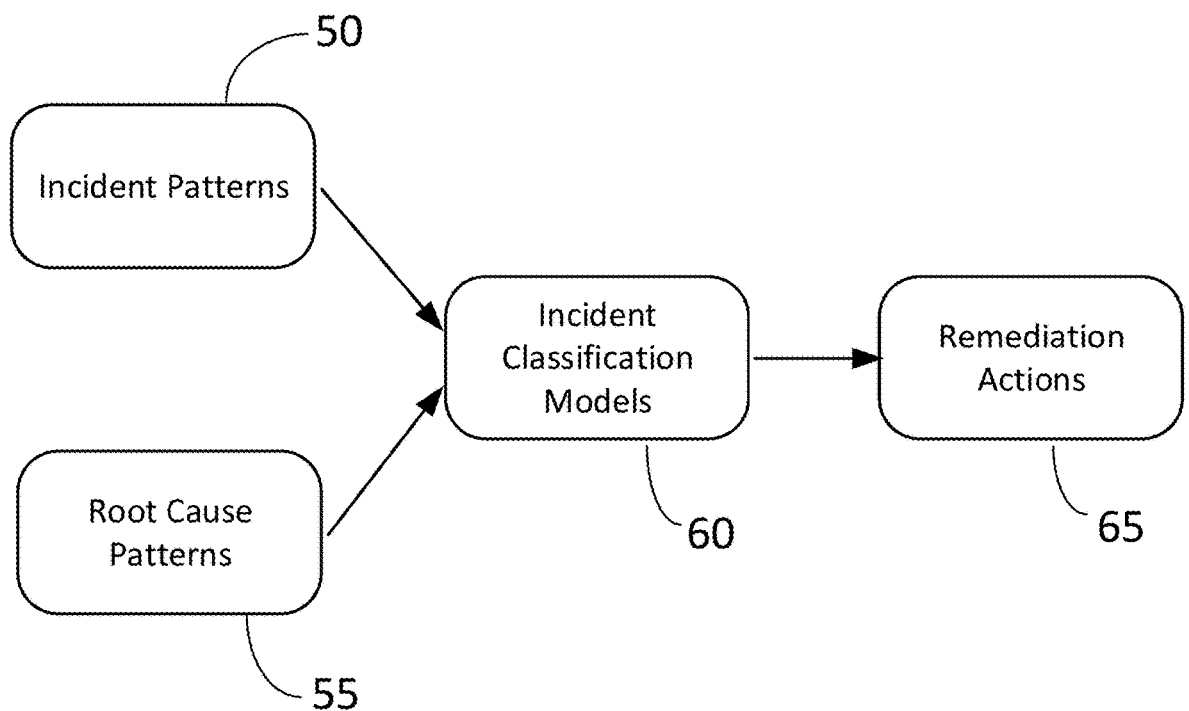
FIG. 2, is a view of the process flow to perform incident remediation recommendations consistent with certain embodiments of the present invention.

Turning now to FIG. 2, this figure presents a view of the process flow to perform incident remediation recommendations consistent with certain embodiments of the present invention. The incident prevention system receives incident pattern 50 and root cause pattern 55 information from components within a networked system being monitored. The incident prevention system may perform NLP processing and other machine learning techniques to analyze the information within the incident pattern 50 and root cause pattern 55 data to create one or more incident classification models 60 to establish categories for the incidents occurring within the network system being monitored. The incident prevention system utilizes past actions and techniques that have been successfully applied to correct the incidents within the monitored network system and other networked systems to identify and report remediation actions 65 to one or more users. Additionally, the incident prevention system may apply recommended remediation actions and techniques to automatically correct the issue or incident within the monitored networked system, and may annotate a remediation file with the recommended and/or applied remediation technique and store the remediation file for future analysis efforts.

Figure 3:
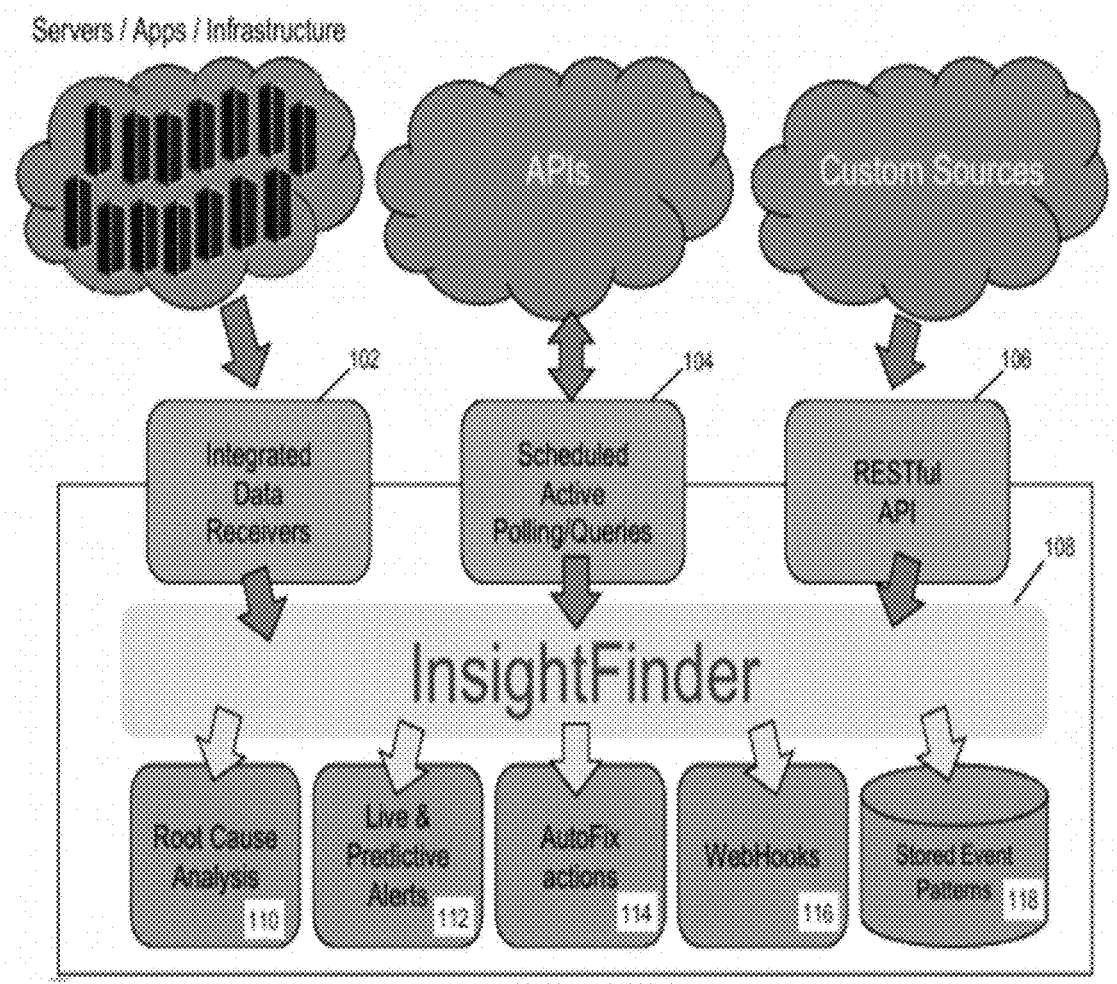
FIG. 3 is a view of the system architecture to perform pattern extraction and relationship extraction consistent with certain embodiments of the present invention.

Turning now to FIG. 3, this figure presents a view of the system architecture to perform pattern extraction and relationship extraction consistent with certain embodiments of the present invention. In an exemplary embodiment, the innovation first provides automatic unsupervised multi-variant statistical classification methods to extract principle event patterns from large amounts of raw metric data streams for a system under analysis. The system architecture provides for ingestion of events and data from data receivers integrated 102 into the system such as events received from independent and cloud-based servers, apps active on mobile devices, and infrastructure components. Additional ingestion may be received from Application Programming Interfaces (APIs) from scheduled active polling and/or queries 104 and Custom Sources such as the RESTful API 106. Event, log, and other data patterns are received from all sources by the Insightfinder application 108.

In an embodiment, each event pattern captures a unique system state. In this embodiment, the system may capture all unique system states of a live production server using unsupervised online learning algorithms. The Insightfinder application 108 performs trained extraction, anomaly detection, and component actions to create output that is meaningful to a user. The Insightfinder application provides root cause analysis 110, provides live and predictive alerts 112 for discovered anomalies, provides autofix actions 114 for known anomalies and/or issues, provides webhooks 116 for further information discovery and problem correction, and provides for stored event patterns 118 to optimize future discovery and correction of problem events, anomalies, and issues.

Figure 4:
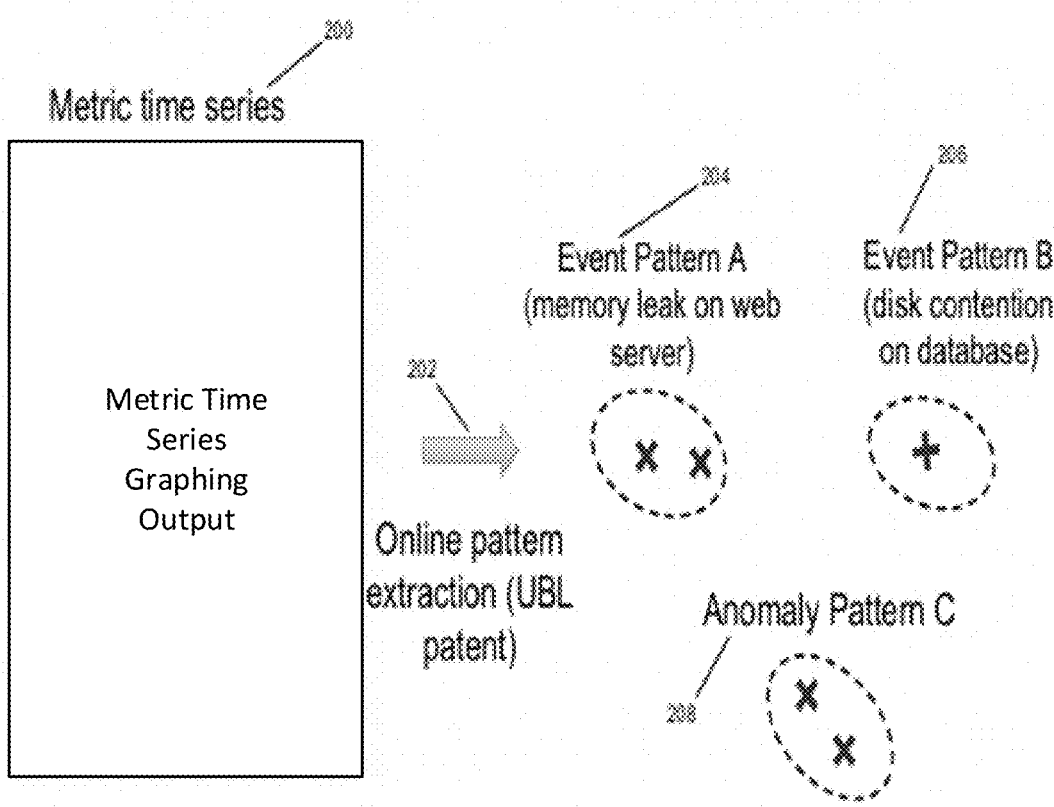
FIG. 4 is a view of metric event pattern extraction consistent with certain embodiments of the present invention.

Turning now to FIG. 4, this figure presents a view of metric event pattern extraction consistent with certain embodiments of the present invention. In an exemplary embodiment, the system presents the operation for metric event pattern extraction utilizing incoming data values from a plurality of sources such as, but not limited to, data receivers, APIs and custom sources. Input data may be composed of a series of parameters that are ingested as metric time series event data 200. The metric time series data 200 may, by way of example and not of limitation, be composed of a time span snapshot of available cpu percentage over time, the amount of free memory in mega-bytes, the number of input data units, the amount of cpu time consumed by users in milliseconds, the amount of cpu time consumed by the system in milliseconds, total memory consumption in mega-bytes, and the overall queue length for jobs in process, among other parameters that may be specified by the system as such additional parameters are identified. The system may have a software module operative to perform online pattern extraction 202 from the input metric time series data input to the system.

In an embodiment, the online pattern extraction process may discover a pattern, entitled Event Pattern A 204, that is indicative of a memory leak on a web server. As previously described, Event Pattern A 204 may be established through an event pattern unique that is the result of gradually increasing memory consumption and a near constant CPU usage, the system may create a label a "memory leak" for Event Pattern A 204. Similarly, metric values that indicate that there is disk contention on a database within the purview of the received metric time series values may be labeled by the system as Event Pattern B 206.

In an embodiment, metric time series values that have not previously been received, or produce a pattern that is not yet known to the system may result in an Anomaly branding by the system such as is represented by Anomaly Pattern C 208. Anomaly Pattern C 208 may occur again on a frequent or intermittent basis, however, the system is operative to store Anomaly Pattern C 208 in a pattern database. This permits the system to recall Anomaly Pattern C 208, among other stored patterns, whenever the same pattern is presented by the Online Pattern Extraction process 202. As anomalies are discovered and labeled with the system condition that corresponds to the metric data values that contribute to the identified anomaly pattern, either by the user or administrator of the system or by the system, the system may replace the anomaly term with the identified system condition and rename the anomaly pattern with said system condition. In this manner, the system may learn to recognize anomalous conditions and provide proper labels and recommendations for such patterns.

Figure 5:
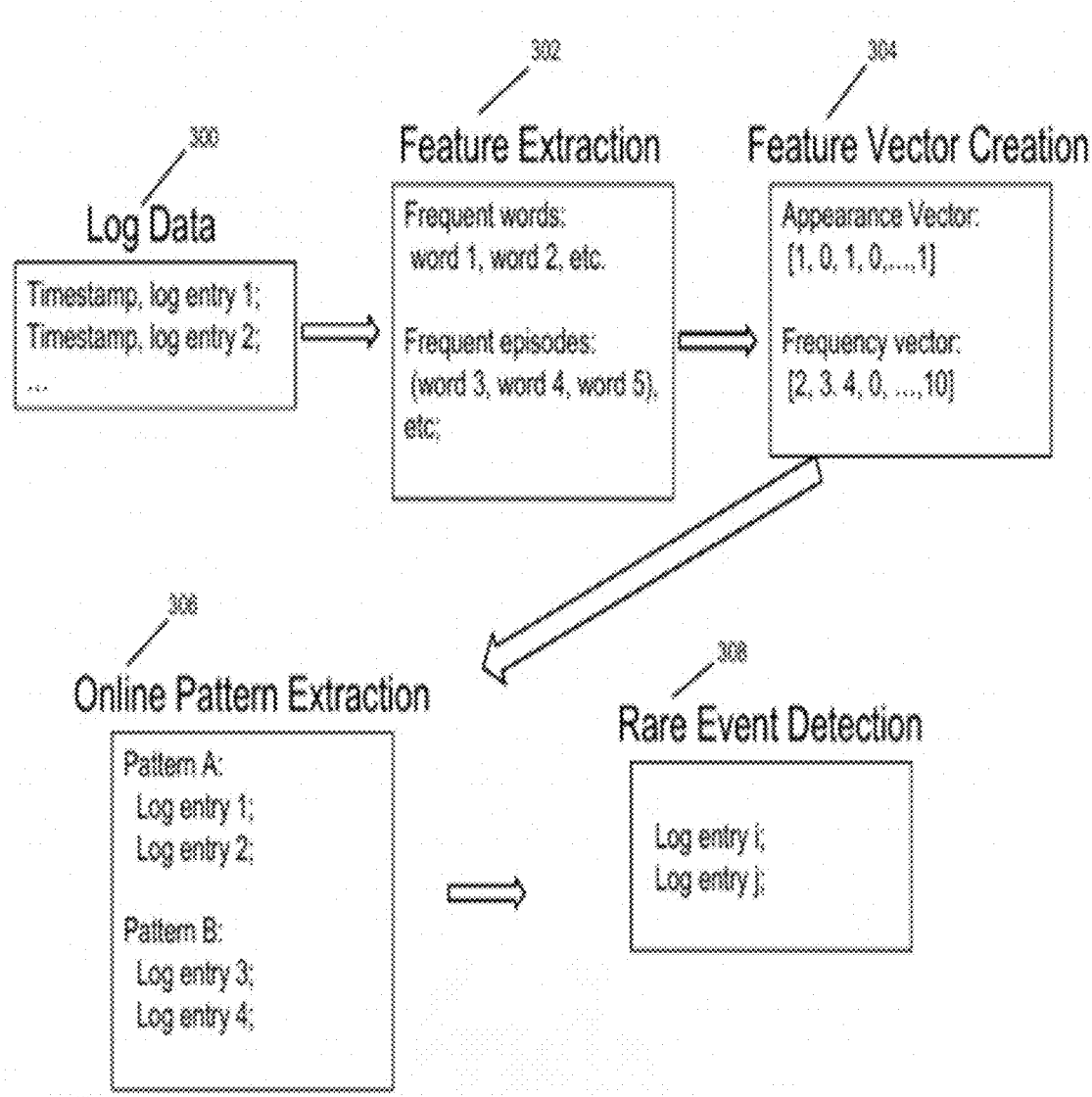
FIG. 5 is a view of log event pattern extraction consistent with certain embodiments of the present invention.

Turning now to FIG. 5, this figure presents a view of log event pattern extraction consistent with certain embodiments of the present invention. In an exemplary embodiment, the system does not depend solely upon patterns extracted from metric time series input to perform analysis and identify patterns indicating events that may require remediation. The system also receives collected log data that may be semi-structured or unstructured to provide additional verification for patterns possibly requiring remediation. The received log data 300 is subjected to statistical machine learning algorithms to extract patterns from those data. Feature extraction 302 from the log data uses two principal schemes to analyze the received log data 300. The system may extract frequently used, or popular, words from the received log data 300. The system also determines the frequency of use for each popular word. When extracting frequently used words a word filtering function is employed to filter out uninteresting words such as articles, verbs, and adjectives to reduce the amount of processing time and optimize the extraction of words that may truly be indicative of anomalous patterns. The system may also extract popular phrases using a frequent episode mining algorithm as well as the frequency of occurrence of each popular phrase. The system may also present mined frequently used words and phrases to a user to permit the user to choose the interesting keywords and phrases the user wants the system to use in performing further analysis on the log data.

In an embodiment, the system may utilize the occurrences of popular words and popular phrases in combination with the frequency of occurrence of each popular word and/or phrase to construct frequency feature vectors 304. The frequency feature vectors may be composed of an appearance vector for each appearance of a particular word or phrase, and a frequency vector for the number of times each popular word or phrase occurs in the received log data 300. After the creation of the frequency feature vectors has been completed, the innovation may apply unsupervised machine learning algorithms over extracted feature vectors to group log data with similar feature patterns together to perform online pattern extraction 306. This online pattern extraction service 306 as applied to received log data 300 can help users browse through a large number of log events and extract useful information in a more efficient way. Moreover, this classification can be useful for incident triage by helping a user to identify previously diagnosed events.

In an embodiment, the system may utilize the extracted patterns to perform rare event detection 308 from the received log data 300. Rare log events may indicate some interesting incidents, which could expedite the incident triage processing by giving the rare patterns higher processing priority. The innovation may also compute a windowed frequency count for each extracted log pattern and construct a histogram chart for each pattern. In a non-limiting example, if the log pattern A appeared 5 times in [0, W] and 10 times in [W+1, 2×W], the system may produce a histogram of [5,10]. The innovation may then perform anomaly detection over the histogram to detect which event patterns appear more or less frequently in an unusual way. The histogram may provide a user with a view of event patterns that are of interest to the user, how frequently such patterns occur, and may provide the user with the ability to select particular words or phrases for additional analysis and processing.

Figure 6:
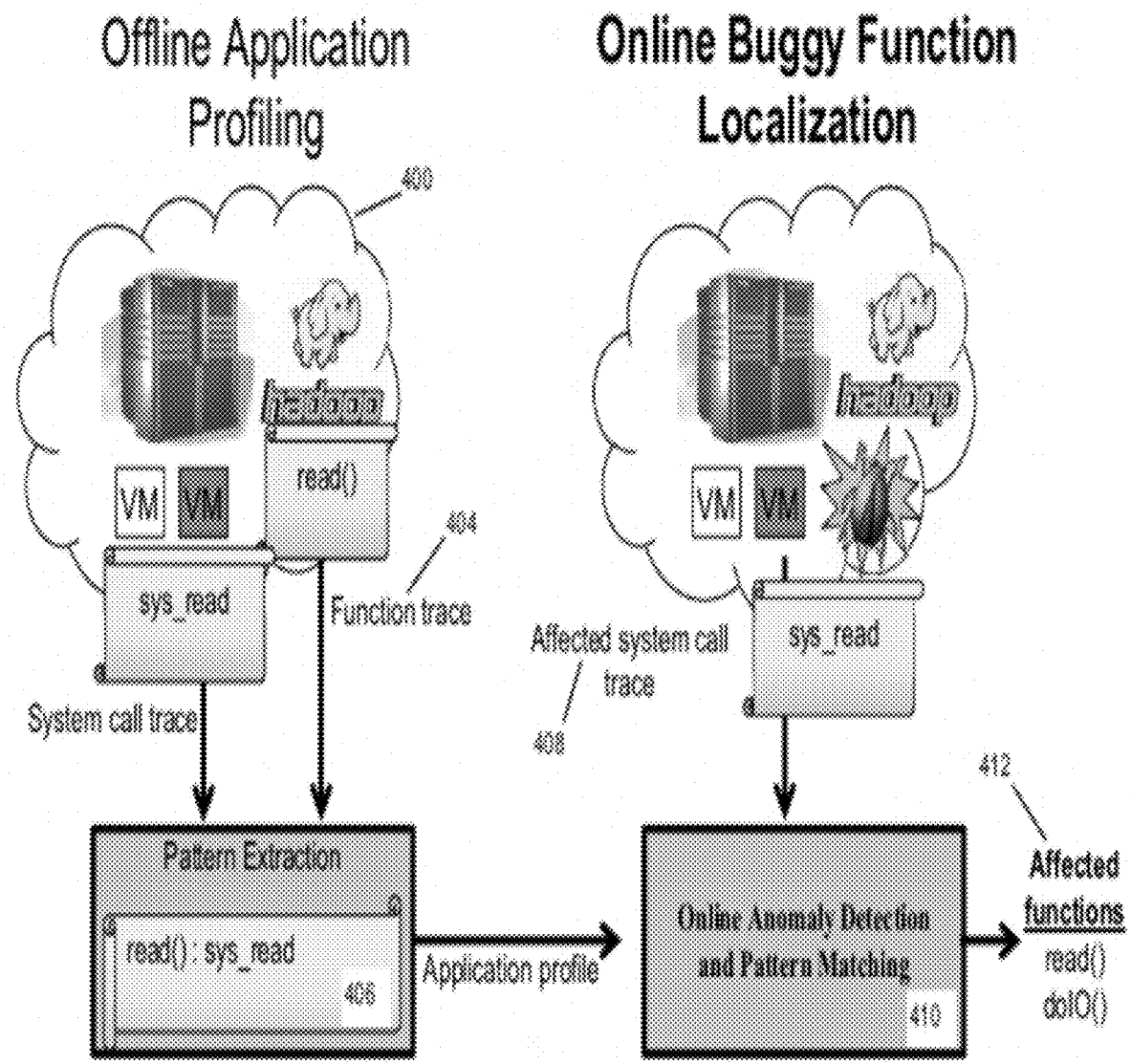
FIG. 6 is a view of system call trace anomaly detection and pattern matching consistent with certain embodiments of the present invention.

Turning now to FIG. 6, this figure presents a view of call trace anomaly detection and pattern matching consistent with certain embodiments of the present invention. In an exemplary embodiment, in addition to metric and log data, the innovation may also provide system call tracing function 400 that can collect runtime system call traces for production server applications. The innovation may first perform simple pre-processing to extract system call information in the form of (timestamp, process ID, thread ID, system call type). The innovation may then segment the large raw system call traces into smaller groups of related system calls that are termed execution units based on process identifier, thread identifier, and the time gap between two continuous system calls 402. The innovation may next perform frequent episode mining over the system call trace within each execution unit to identify common system call sequences to trace functions that are frequently called and the frequency with which such functions are called 404. The system call trace and function trace analysis contribute to the pattern extraction 406 to disclose functions that display indicators of being affected in some way that may require intervention.

In an embodiment, the innovation may also perform an affected system call trace detection 408 action in each execution unit to identify which system calls are either executed more frequently or take longer time to execute within each execution unit to determine which functions require further processing. The innovation may then label each execution unit as normal or abnormal based on the anomaly detection results in comparison with the system call execution time or frequency. The innovation may also map each execution unit to high level program constructs such as application functions by profiling the frequent system call episodes produced by different application functions.

An online anomaly detection and pattern matching 410 module receives the extracted patterns from the system call trace 402 and function trace 404 operations. The patterns provide information regarding the affected system calls as identified by the analysis of the system calls and operative functions. The online anomaly detection and pattern matching 410 module may provide an adaptive pattern learning framework that can accommodate both environment changes and different kinds of applications such as long-running batch jobs in comparison with short-running tasks. At a high level, each pattern is a compressed representation of one specific system state and each model we create consists of all possible patterns of the behavior of the system being analyzed over a period of time (e.g., one day) for each system component. The innovation may then take a model ensemble approach to building a group of models for each system component where each system component could be any of a job, a task, a micro-service, or any other identified system component.

In an embodiment, the learning framework expressed by the innovation is adaptive with regard to both dynamic environments and application component types. Initially, the innovation may adopt different sampling rate for deriving models for different application components. In a non-limiting example, for long-running jobs, the innovation may employ a relatively long sampling period (e.g., 5 minutes) for pattern extraction. However, for short-running tasks, preferably a fine grained sampling period is utilized (e.g., 1 second) for pattern extraction. The innovation may then perform dynamic model consolidations to improve the model quality for each application component. The innovation aggregates the training data coming from multiple similar tasks or jobs to train one consolidated model instead of creating a set of separate models trained from segmented data. Performing this operation is particularly important for short-running tasks which often just exist for a few minutes, which will result in an insufficiently trained model. The result of the online anomaly detection and pattern matching function is a set of affected functions 412 for the system under analysis.

Figure 7:
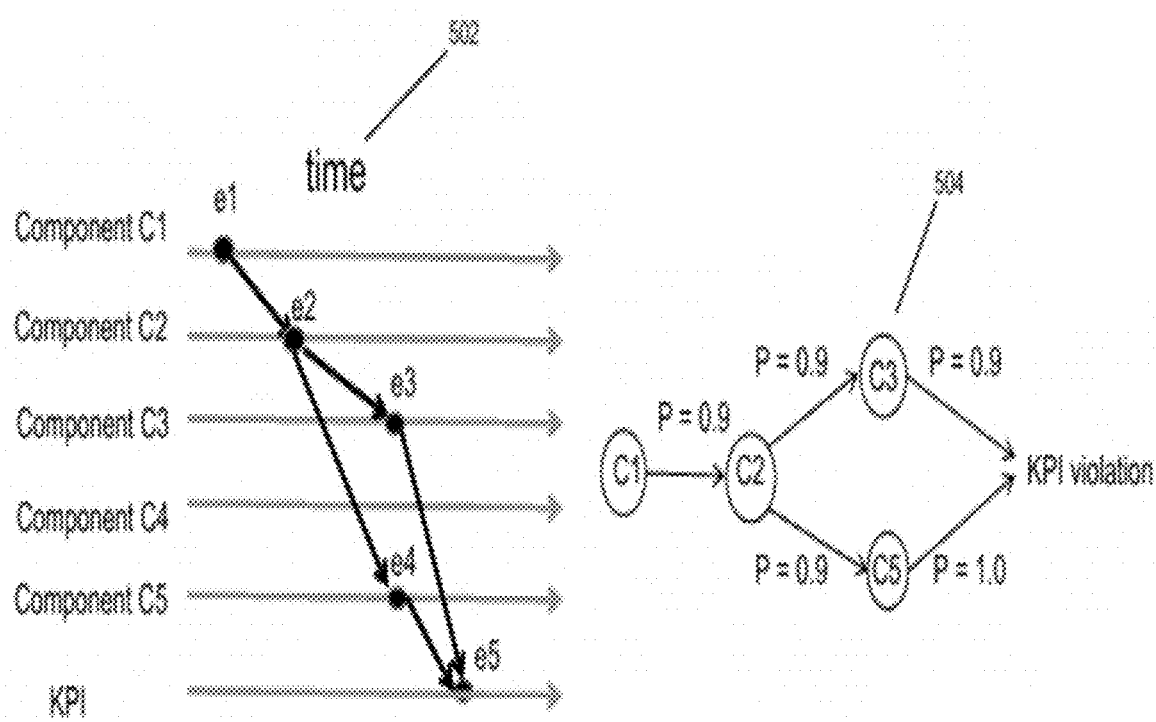
FIG. 7 is a view of component causal relationship discovery consistent with certain embodiments of the present invention.

Turning now to FIG. 7, this figure presents a view of component causal relationship discovery consistent with certain embodiments of the present invention. In this embodiment, the event association algorithms extract possible correlation and causality relationships among different system components based on the start time of different events 502. Two components C1 and C2 are said to be correlated if anomalous events often occur on both components concurrently. Two components C1 and C2 are said to have causal relationships if anomalous events on C1 often happen before anomalous event on C2. In a non-limiting example, if database DB always starts to experience anomalies a few minutes after the web server WS has some issues, the inference is that there exists a possible causal relationship between DB and WS.

In an embodiment, based on the extracted events from metric data, log data, and system call trace data, holistic root cause analysis may be performed to reveal the reason why a problem occurs in the production system. Specifically, the root cause analysis tool may identify the exact host(s), system metric(s), application component(s), and buggy function(s) attributed to a production system problem. The root cause analysis executes an automatic drill down root cause analysis protocol to gradually narrow down the location of the root cause hosts, components, and application functions in a distributed system. When an abnormal metric pattern is detected, a log and system call trace analysis may be triggered to detect whether there exists any abnormalities in log and system call trace data to further pin down the root causes. In a non-limiting example, it can be distinguished whether the root cause comes from outside or inside the application software. If the root cause is located inside the application software, the buggy application function may be further localized using the system call trace pattern extraction algorithm described above.

In an embodiment, the system may use a set of causality relationships and probabilities of possible correlation to determine common component failure sequences 504. Frequent sequence mining may also be applied to discover common component failing sequences, that is, anomaly on component A "happens before" the anomaly on component B. Since those raw event sequences can be noisy and imprecise, frequent sequence mining may be used to extract strong causality relationships. Additional dependency information may be leveraged, such as network topologies, application structures, and communication patterns, to cross validate the group patterns discovered by the causal relationship algorithms. The cascade of failures among strongly correlated components may provide a determination of one or more Key Performance Indicator (KPI) violations.

Figure 8:
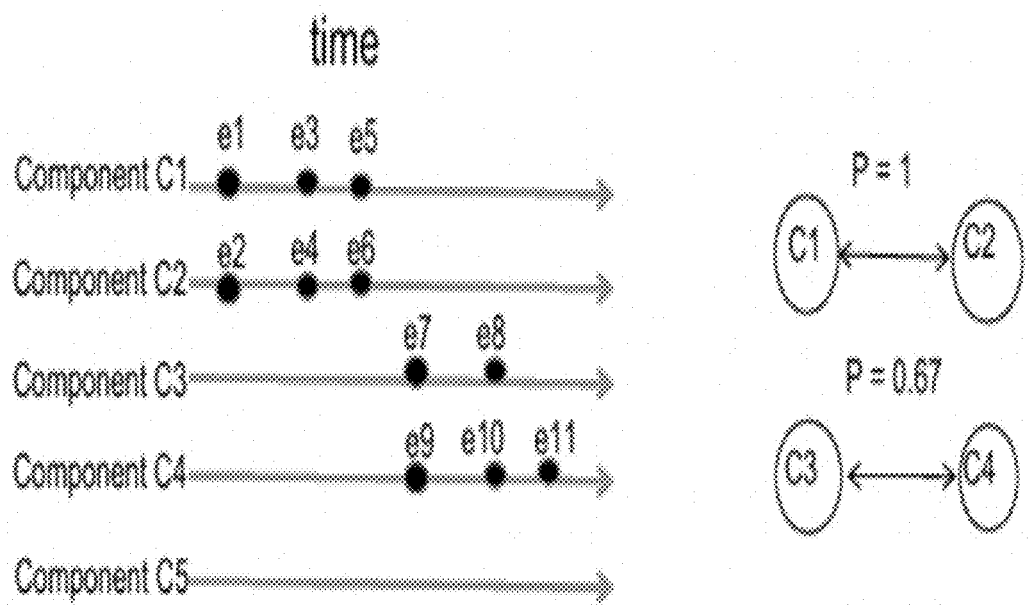
FIG. 8 is a view of component correlation relationship extraction consistent with certain embodiments of the present invention.

Turning now to FIG. 8, this figure presents a view of component correlation relationship extraction consistent with certain embodiments of the present invention.

In this embodiment, holistic performance anomaly impact prediction 600 may be provided to estimate the potential impact of a detected anomaly. Based on the anomaly correlation patterns, a first estimate may be provided as to which other components are likely to become anomalous after detecting one component anomaly. In a non-limiting example, after detecting an anomaly on switch S3 (Component 1), a prediction that edge router R1 (Component 2) will probably fail soon may be made since these components always experience anomalies together. Subsequently, a prediction may be provided regarding which application or service will be likely to experience service outages or key performance indicator (KPI) violations based on the causal relationships between system metrics and KPI violations.

In a non-limiting example, consider a distributed multi-tier applications consisting of web service tier and database tier. If an observation that a disk contention anomaly on the database tier is likely to cause a CPU contention on the web server tier, and further a response time increase (e.g., database disk contention-Web CPU spike-KPI violation), early alarms may be raised about any web server anomaly and KPI violation when a database anomaly is detected. Thus, the technique herein recited can achieve early performance problem detection by leveraging causality analysis results.

While certain illustrative embodiments have been described, it is evident that many alternatives, modifications, permutations and variations will become apparent to those skilled in the art in light of the foregoing description.

I claim:

1. A system for automated incident prevention, comprising:
   a processor in networked data communication with a plurality of edge analysis engines operative on one or more networked edge nodes;
   the plurality of edge analysis engines performing anomaly detection on machine data, comprising metric data, log entries, application performance tracing data, and/or system call data utilizing unsupervised machine learning algorithms;
   said unsupervised machine learning algorithms performing an analysis within each of said networked edge nodes to detect anomalous data at each of said networked edge nodes;
   a causal analysis algorithm utilizing an inference component to analyze anomalous machine data to extract specific anomalous patterns to characterize specific root causes and create a root cause pattern for each type of anomalous system condition;
   a software module operative to identify key features of said incident patterns to automatically create a label identifying a system condition that corresponds to each of said incident patterns;
   said software module utilizing said created label to label each of the one or more incident patterns and an associated root cause pattern for said one or more anomalous system conditions;
   said one or more edge analysis engines forwarding only labeled incident patterns to a core analysis engine;
   said core analysis engine combining all forwarded labeled incident patterns into a data store;
   the core analysis engine performing holistic causal analysis utilizing said data store to classify a detected incident into one or more of said incident patterns;
   the core analysis engine utilizing a self-learning machine algorithm to pair a root cause pattern and a predicted incident pattern and map said pair to a remediation action appropriate to said root cause and predicted incident pair;
   utilizing said self-learning machine learning algorithm to determine remediation recommendations for incidents triggered by different root cause and predicted incident pairs to continuously enhance remediation recommendation models and adapt said remediation recommendation models to dynamic computing environments;
   the core analysis engine applying reinforcement learning by analyzing triggered remediation recommendation operations so as to effect change in a system health score; and
   said core analysis engine applying said enhanced remediation recommendation models to perform remediation actions to effect positive change in said system health score and providing said remediation actions to a system user.

2. The system of claim 1, further comprising a software module operative to determine a root cause pattern from said machine data where said machine data comprise one or more machine data anomalies.

3. The system of claim 1, further comprising a software module operative to perform Natural Language Processing (NLP) to consolidate related anomalous log entries into a category.

4. The system of claim 1, further comprising a software module operative to perform NLP analysis on said incident reports to extract phrases and patterns of phrases from said incident reports.

5. The system of claim 1, further comprising a software module operative to create one or more filters for said phrases and patterns of phrases to perform incident pattern extraction from one or more incident reports.

6. The system of claim 1, further comprising a software module operative to combine NLP analysis and infrastructure metadata information to predict remediation required for an identified category.

7. The system of claim 1, further comprising a software module operative to annotate a remediation data file and storing said remediation data file in an electronic storage repository.

8. The system of claim 1, further comprising classification models for remediation recommendations through the use of one or more machine learning algorithms.

9. The system of claim 1, further comprising a software module for providing an efficient and scalable search capability for a remediation inference component to quickly find matching root cause and incident patterns.

10. A method for automated incident prevention, comprising:
   the plurality of edge analysis engines performing anomaly detection on machine data, comprising metric data, log entries, application performance tracing data, and/or system call data utilizing unsupervised machine learning algorithms;
   said unsupervised machine learning algorithms performing an analysis within each of said networked edge nodes to detect anomalous data at each of said networked edge nodes;
   utilizing a causal analysis algorithm to analyze anomalous machine data to extract specific anomalous patterns to characterize specific root causes and create a root cause pattern for each type of anomalous system condition;
   identifying key features of said incident patterns to automatically create a label identifying a system condition that corresponds to each of said incident patterns;
   labeling one or more system conditions utilizing any of said created labels that correspond to said anomalous data that define one or more incident patterns and an associated root cause pattern for said one or more system conditions;
   forwarding only said labeled incident patterns as labeled by said one or more edge analysis engines to a core analysis engine;
   combining all forwarded labeled incident patterns into a data store;
   performing holistic causal analysis utilizing said data store to classify a detected incident into one or more of said incident patterns;

analyzing said incident reports and automatically detected root cause data to determine a category for each of said detected incident patterns;

utilizing a self-learning machine algorithm to map a root cause and a predicted incident pair to a remediation action appropriate to said root cause and predicted incident pair;

utilizing said self-learning machine learning algorithm to determine remediation recommendations for incidents triggered by different predicted incident pattern and associated root cause pairs to continuously enhance remediation recommendation models and adapt said remediation recommendation models to dynamic computing environments;

applying reinforcement learning by analyzing triggered remediation recommendation operations so as to effect change in a system health score; and applying said enhanced remediation recommendation models to perform remediation actions to effect positive change in said system health score and providing said remediation actions to a system user.

11. The method of claim 10, further comprising a software module operative to utilize user feedback to enhance one or more remediation classification models.

12. The method of claim 10, further comprising creating one or more incident classification models from said incident pattern and root cause pattern data.

13. The method of claim 10, further comprising analyzing receiving at least incident report data and machine data, comprising metric data, anomalous log entries, application performance tracing data, and/or system call data, utilizing NLP to consolidate related anomalous log entries and to extract phrases and patterns of phrases from said incident reports.

14. The method of claim 10, further comprising reporting one or more remediation actions to a user and permitting the activation of said one or more remediation actions through a remediation workflow engine that automatically triggers said remediation actions upon detection of an incident.

* * * * *